United States Patent
Yang et al.

(10) Patent No.: US 12,026,297 B2
(45) Date of Patent: Jul. 2, 2024

(54) WEARABLE ELECTRONIC DEVICE AND INPUT STRUCTURE USING MOTION SENSOR IN THE SAME

(71) Applicant: Samsung Electronics Co., Ltd., Gyeonggi-do (KR)

(72) Inventors: Hyunmo Yang, Gyeonggi-do (KR); Juhwan Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 17/570,513

(22) Filed: Jan. 7, 2022

(65) Prior Publication Data

US 2022/0214744 A1    Jul. 7, 2022

Related U.S. Application Data

(63) Continuation of application No. PCT/KR2022/000078, filed on Jan. 4, 2022.

(30) Foreign Application Priority Data

Jan. 7, 2021    (KR) .................. 10-2021-0002097

(51) Int. Cl.
*G06F 3/01* (2006.01)
*G01P 13/00* (2006.01)
(Continued)

(52) U.S. Cl.
CPC .............. *G06F 3/011* (2013.01); *G01P 13/00* (2013.01); *G06F 1/163* (2013.01); *G06F 3/041* (2013.01);
(Continued)

(58) Field of Classification Search
CPC .......... G06F 3/011; G06F 1/163; G06F 3/041; G06F 3/165; G06F 3/167; G01P 13/00;
(Continued)

(56) References Cited

U.S. PATENT DOCUMENTS 10,310,624 B2    6/2019    Kato et al.
2012/0007800 A1    1/2012    Jaroslaw
(Continued)

FOREIGN PATENT DOCUMENTS

JP    6064988 B2    1/2017
JP    2019-16378 A    1/2019
(Continued)

OTHER PUBLICATIONS

Written Opinion dated Mar. 24, 2022.
International Search Report dated Mar. 24, 2022.

*Primary Examiner* — Matthew A Eason
*Assistant Examiner* — Chayce R Bibbee
(74) *Attorney, Agent, or Firm* — Cha & Reiter, LLC

(57) ABSTRACT

A wearable electronic device is disclosed. The wearable electronic device may include a display, a main frame to secure the display, a first support frame and second support frame connected to opposite ends of the main frame, and being mountable on a user's ears, a motion sensor installed to at least one of the first support frame and the second support frame, and a protrusion structure formed on one surface of at least one of the first support frame and the second support frame, the protrusion structure including first protrusion patterns disposed at a first interval, and second protrusion patterns disposed at a second interval wider than the first interval. Certain contacts to the protrusion patterns are detectable as inputs by a processor.

20 Claims, 9 Drawing Sheets

(51) Int. Cl.
*G06F 1/16* (2006.01)
*G06F 3/041* (2006.01)
*G06F 3/16* (2006.01)
*G09G 3/20* (2006.01)

(52) U.S. Cl.
CPC .............. *G06F 3/165* (2013.01); *G06F 3/167* (2013.01); *G09G 3/20* (2013.01); *G09G 2320/0626* (2013.01); *G09G 2354/00* (2013.01)

(58) Field of Classification Search
CPC .............. G09G 3/20; G09G 2320/0626; G09G 2354/00
See application file for complete search history.

(56) References Cited

U.S. PATENT DOCUMENTS

| | | | |
|---|---|---|---|
| 2015/0002465 A1* | 1/2015 | Tsukahara | H04N 5/7491 345/174 |
| 2016/0011420 A1 | 1/2016 | Jang et al. | |
| 2016/0034042 A1 | 2/2016 | Joo | |
| 2017/0242496 A1 | 8/2017 | Park | |
| 2019/0179525 A1* | 6/2019 | Starner | G02B 27/0172 |
| 2020/0064634 A1 | 2/2020 | Kizaki | |
| 2020/0104039 A1 | 4/2020 | Robertson et al. | |

FOREIGN PATENT DOCUMENTS

| | | |
|---|---|---|
| KR | 10-1524575 B1 | 6/2015 |
| KR | 10-2016-0006053 A | 1/2016 |
| KR | 10-2016-0016540 A | 2/2016 |
| KR | 10-2016-0093890 A | 8/2016 |

\* cited by examiner

WEARABLE ELECTRONIC DEVICE AND INPUT STRUCTURE USING MOTION SENSOR IN THE SAME

CROSS-REFERENCE TO RELATED APPLICATION(S)

This application is a continuation of International Application No. PCT/KR2022/000078, filed on Jan. 4, 2022, which claims priority to Korean Patent Application No. 10-2021-0002097, filed on Jan. 7, 2021 in the Korean Intellectual Property Office, the disclosures of which are herein incorporated by reference.

TECHNICAL FIELD

Certain embodiments relate to a wearable electronic device and an input structure using an IMU sensor.

BACKGROUND

Recent times have seen increased demand for electronic devices supporting augmented reality (AR) and/or mixed reality (MR) services. Such devices provide digital information via superimposing virtual images on backgrounds, images and real-world elements.

Electronic devices that support AR/MR services may include, for example, an eyeglass-type wearable electronic device (or "AR glass," for short). The eyeglass-type wearable electronic device may be worn on the user's head, giving the impression of virtual, digital content extant within real environments. Eyeglass-type wearable electronic devices have been generating increasing interest, as next-generation devices continue to emerge with the capacity to deliver realistic media presentation, in line with the advancement of communication technologies enabling large-capacity data transmission, as in the case of 5G communication.

It may be desirable for eyeglass-type wearable electronic device to be compact, such that the same can be worn comfortably like normal eyeglasses. Further, to enable a compact design, components of the electronic device are typically installed in a compact, high-density arrangement. However, when sensors (such as, for example, motion sensors) and communication antennas are necessarily mounted in the eyeglass-type wearable device, and which, because of their configurations, may limit the available space in which other components can be mounted. For example, the eyeglass-type wearable electronic device may have insufficient mounting space for relatively bulky input devices (such as, for example, key button structures for volume adjustment or brightness adjustment, and/or capacitive touch-type input devices utilizing touch panels and touch ICs). Thus, there is a need to improve the input device structure for such devices.

SUMMARY

A wearable electronic device according to certain embodiments may include a display, a main frame configured to secure the display, a first support frame and a second support frame connected to opposite ends of the main frame, respectively, and mountable on ears, a motion sensor installed to at least one of the first support frame and the second support frame, and a protrusion structure formed on one surface of at least one of the first support frame and the second support frame, the protrusion structure including first protrusion patterns disposed at a first interval, and second protrusion patterns disposed at a second interval wider than the first interval.

A wearable electronic device according to certain embodiments may include a display, a frame configured to support the display, a motion sensor mounted on at least a portion of the frame, and a protrusion structure formed on at least a partial surface of the frame, wherein the protrusion structure includes first protrusion patterns disposed at a first interval, and second protrusion patterns disposed at a second interval wider than the first interval.

Certain embodiments may provide a wearable device capable of detecting user inputs, without interoperation with an external input device, using a protrusion structure capable of distinguishing user input signals through a motion sensor (such as, for example, IMU sensor) mounted in a wearable device.

According to certain embodiments, a protrusion structure may be disposed on at least a part of a wearable device, and user inputs may be distinguished from information of a motion sensor (such as, for example, IMU sensor) resulting from the protrusion structure, thereby reducing costs and difficulty of installing input devices in certain wearable devices.

DETAILED DESCRIPTION

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
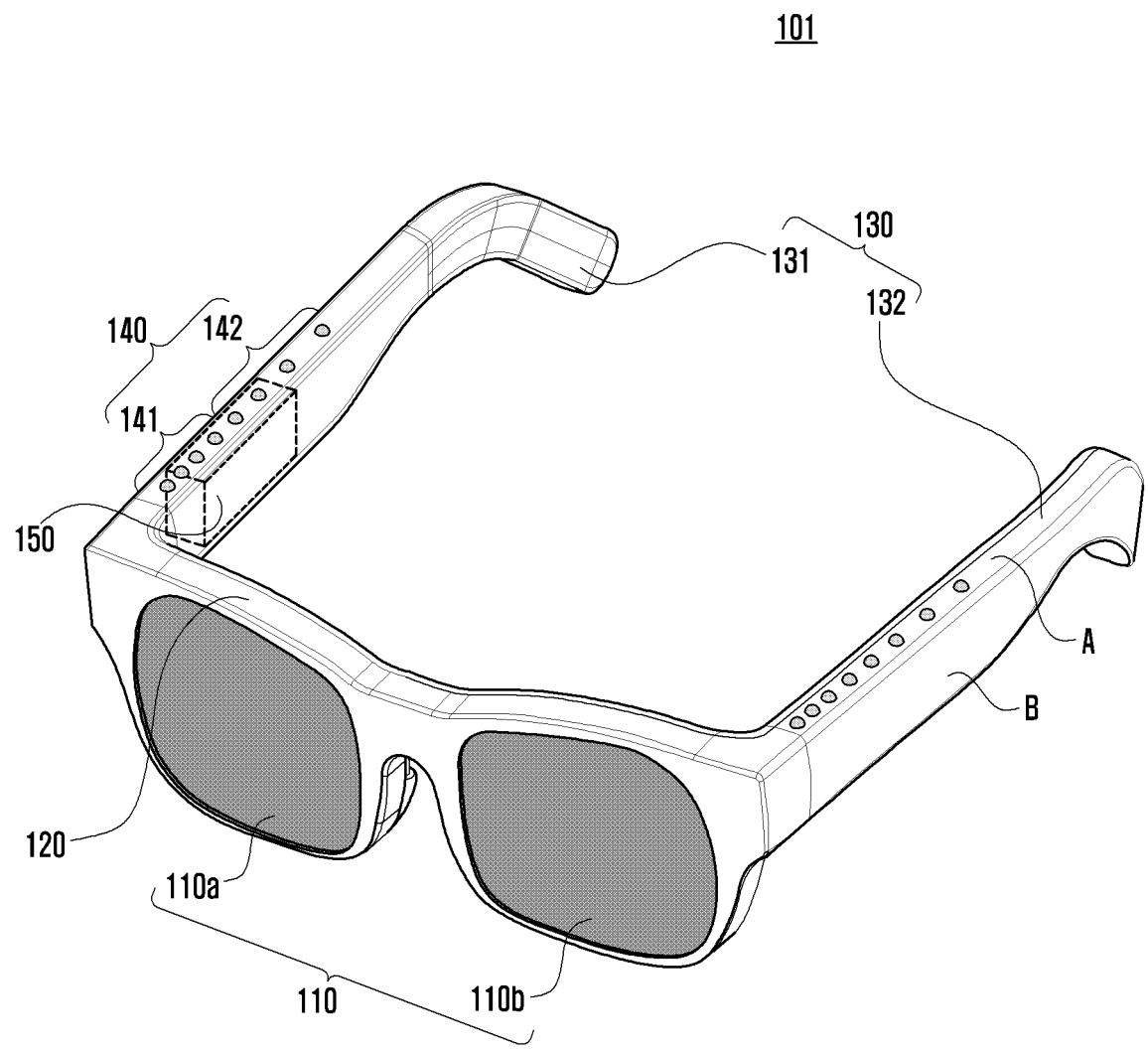
FIG. 1 illustrates a wearable electronic device providing an augmented reality service according to certain embodiments.

FIG. 1 illustrates a wearable electronic device providing an augmented reality service according to certain embodiments.

In FIG. 1, the wearable electronic device may include a glasses-type display device (or augmented reality (AR) glasses) but is not limited thereto.

Referring to FIG. 1, according to an embodiment, the wearable electronic device 101 may be an electronic device that provides an augmented reality (AR), mixed reality (MR), or virtual reality (VR) service, and may be, for example, a glasses-type wearable electronic device. The wearable electronic device 101 may be configured in the form of at least one of glasses, goggles, a helmet, or a hat, but is not limited thereto.

The wearable electronic device 101 may be worn on a user's face, to provide an image (e.g., an augmented reality image, a mixed reality image, or a virtual reality image) to the user's eyes. The wearable electronic device 101 may provide an augmented reality service in which virtual information (or virtual object) is added to (e.g., overlaid on) at least a part of an actual real-world space (or real-world environment). For example, the wearable electronic device 101 may provide a user with virtual information superimposed on a real-world space corresponding to the field of view (FOV) of the wearer.

According to an embodiment, the wearable electronic device 101 may include a glass member 110 disposed at positions corresponding to both eyes (e.g., the left and right eyes) of a user, a main frame 120 configured to fix the glass member 110, a support frame 130 connected to each of the opposite ends of the main frame 120 to be mounted on the user's ears, a protrusion structure 140 disposed on at least one surface of the support frame 130, and a motion sensor, for example, an inertial measurement unit (IMU) sensor 150, mounted in at least a part of the support frame 130. Hereinafter, the motion sensor will be described as the "IMU" sensor 150 for convenience of description. However, the motion sensor may be replaced with a sensor capable of detecting minute changes in the protrusion structure based-wearable electronic device, such as an altitude heading reference system (AHRS), an acceleration sensor, a gyro sensor, and a motion sensing sensor, etc., in addition to the IMU sensor 150.

According to an embodiment, the glass member 110 may be implemented as separated first glass 110a and second glass 110b, each corresponding to an eyes of a user, respectively, as shown in FIG. 1, but may also be implemented in the form of a single glass element (e.g., spanning both eyes, or a single eye)). The main frame 120 and the support frame 130 may be implemented in the form of a pair of eyeglasses. The main frame 120 may include a structure that is at least partially supported on the user's nose, and the support frame 130 may include a first support frame 131 supported on the ear in a first direction (e.g., the right ear), and a second support frame 132 supported on the ear in a second direction (e.g., the left ear). For example, the main frame 120 and the support frame 130 (e.g., the first support frame 131 and the second support frame 132) may be connected to each other through hinge units (not shown) so as to be foldable relative to the main frame 120.

The protrusion structure 140 may be disposed on at least one surface of the support frame 130 (e.g., the first support frame 131 and the second support frame 132). The protrusion structure 140 may have an integrated structure (e.g., an injection-molding method) with the support frame 130 or a structure coupled (e.g., a bonding method) using an identical member to the support frame 130.

According to an embodiment, the protrusion structure 140 may include a plurality of protrusion patterns arranged on one surface of the support frame 130, in a line running along a first direction. For example, the protrusion structure 140 may include first protrusion patterns 141 disposed at a first interval, and second protrusion patterns 142 disposed at a second interval wider than the first interval.

According to an embodiment, the size and number of the protrusion structures 140 may be different depending on a shape of the support frame 130 but may include protrusion patterns disposed at different intervals thereon.

According to an embodiment, the protrusion structure 140 may be respectively disposed on the first support frame 131 and the second support frame 132 as shown in FIG. 1, but is not limited thereto, and may be disposed on one of the first support frame 131 and the second support frame 132.

According to an embodiment, the protrusion structure 140 may be disposed on surface A (e.g., toward the wearer's head) of each of the first support frame 131 and the second support frame 132 as shown in FIG. 1, but is not limited thereto, and may be disposed on surface B (e.g., toward the wearer's ear) of each of the first support frame 131 and the second support frame 132.

The inertial measurement unit (IMU) sensor 150 may be partially mounted on one of the first support frame 131 and the second support frame 132. The IMU sensor 150 may sense change information (e.g., motion of the device 101, which may be detectable in all directions) of the wearable electronic device 101 and track the same. According to an embodiment, the wearable electronic device 101 may detect whether a user is wearing the wearable electronic device through the IMU sensor 150. The IMU sensor 150 may sense change information of the wearable electronic device according to contact of the protrusion structure, and track the same.

Figure 2:
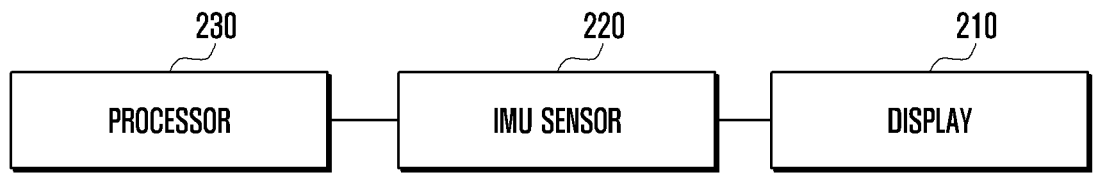
FIG. 2 illustrates a configuration of a wearable electronic device according to certain embodiments.

FIG. 2 illustrates a configuration of a wearable electronic device according to certain embodiments.

Referring to FIG. 2, the wearable electronic device (e.g., the wearable electronic device 101 of FIG. 1) may include a display 210, an IMU sensor 220, and a processor 230.

Although not shown in the drawings, the wearable electronic device 101 may further include a speaker for outputting an audio signal, a microphone for acquiring an audio signal, a camera for acquiring image information, a battery, and a power management module, which will be omitted in FIG. 2 for convenience of description.

According to an embodiment, the display 210 may be configured as a transparent or semi-transparent display. A user may recognize a real-world space (or real environment) through the display 210, as light from the real-world may pass through the glass member 110 and the display 210 to reach the user's eyes.

The display 210 may display a virtual object, such that the virtual information (or virtual object) is superimposed on at least a part of the visible real-world space.

According to an embodiment, the display 210 may be fixed along with the glass member 110 by a main frame (e.g., the main frame 120 of FIG. 1).

According to an embodiment, the display 210 may be implemented as a display module including a display panel and/or a lens. The lens may include a lens including a transparent waveguide. The lens may transmit the light output from the display 210 to the user's eyes. For example, the light emitted from the display 210 may pass through the lens and may be transmitted to a user through the waveguide (e.g., waveguide) formed in the lens.

The waveguide may include at least one of at least one diffractive element (e.g., a diffractive optical element (DOE), holographic optical element (HOE)), or reflective element (e.g., a reflective mirror). The waveguide may induce the display light emitted from a light source towards the user's eye, using the at least one diffractive element or reflective element.

According to an embodiment, when the wearable electronic device 101 may be a virtual reality (VR) device (e.g., a virtual reality device), the glass member 110 of FIG. 1 may be omitted.

According to an embodiment, an inertial motion unit (IMU) sensor 220 may sense a change (e.g., degree of motion) of the wearable electronic device 101 and track the same. The IMU sensor 220 may convert a detected motion change signal into a digital signal (e.g., an IMU sensor value, a sensor waveform) and transmit the digital signal to the processor 230 (or a sensor IC).

According to an embodiment, the IMU sensor 220 may generate a sensor waveform indicating a motion path in a preconfigured unit. The sensor waveform may be time series sensor data from which features of the motion may be extracted.

According to an embodiment, the IMU sensor 220 may be implemented as a module including a 3-axis accelerometer, gyroscope, and magnetometer sensor. According to an embodiment, the IMU sensor 220 may include at least one of an acceleration sensor, a tilt sensor, a gyro sensor, or a 3-axis magnetic sensor. The IMU sensor 220 may extract angle information such as pitch, roll, and yaw by using a gyro sensor, track a speed direction (e.g., jumping, movement speed) using an acceleration sensor, and track a value of the Earth's magnetic field using a geomagnetic sensor, thereby detecting and tracking a direction of the detected motion.

According to an embodiment, the processor 230 may control the overall operation of the wearable electronic device 101. The processor 230 may control operations of an element and other elements (e.g., hardware or software elements) of the electronic device 101 connected to the processor 230 and may perform various data processing or arithmetic operations.

According to an embodiment, the processor 230 may provide an augmented reality service to a user. The processor 230 may recognize information corresponding to a region determined as a user's field of view (FoV) among image information related to a real-world space acquired through a camera (not shown) of the wearable electronic device 101. The processor 230 may generate a virtual object output through the display 210, based on information related to the wearable electronic device 101 (or another electronic device interworking with the electronic device in the wearable) and/or information related to an external object (e.g., an object existing in the real space) located in an actual real-world space.

The processor 230 may control the display 210 such that a virtual object related to an augmented reality service is displayed together with a real-world space obtained through a camera (not shown), based on image information related thereto. The processor 230 may output at least one virtual object through a display region of the display 210. The display region in which a virtual object is displayed by the wearable electronic device 101 may be a part (e.g., at least a part of the display panel) of the display 210. According to an embodiment, the display region may be located at a portion of the first glass 110a and/or the second glass 110b.

According to an embodiment, the processor 230 may determine a user's input due to the protrusion structure. The processor 230 may obtain an IMU sensor value from the IMU sensor and determine whether the IMU sensor value is a sensor waveform generated via contact with the protrusion structure. The processor 230 may analyze a waveform interval of the IMU sensor value generated via the protrusion structure to distinguish between a first input moving in a first direction and a second input moving in a second direction. The processor 230 may perform control using IMU sensing information based on the protrusion structure such that a first function is executed or adjusted when a user input is detected as a first input, and a second function is executed or adjusted when a user input is detected as a second input.

Figure 3:
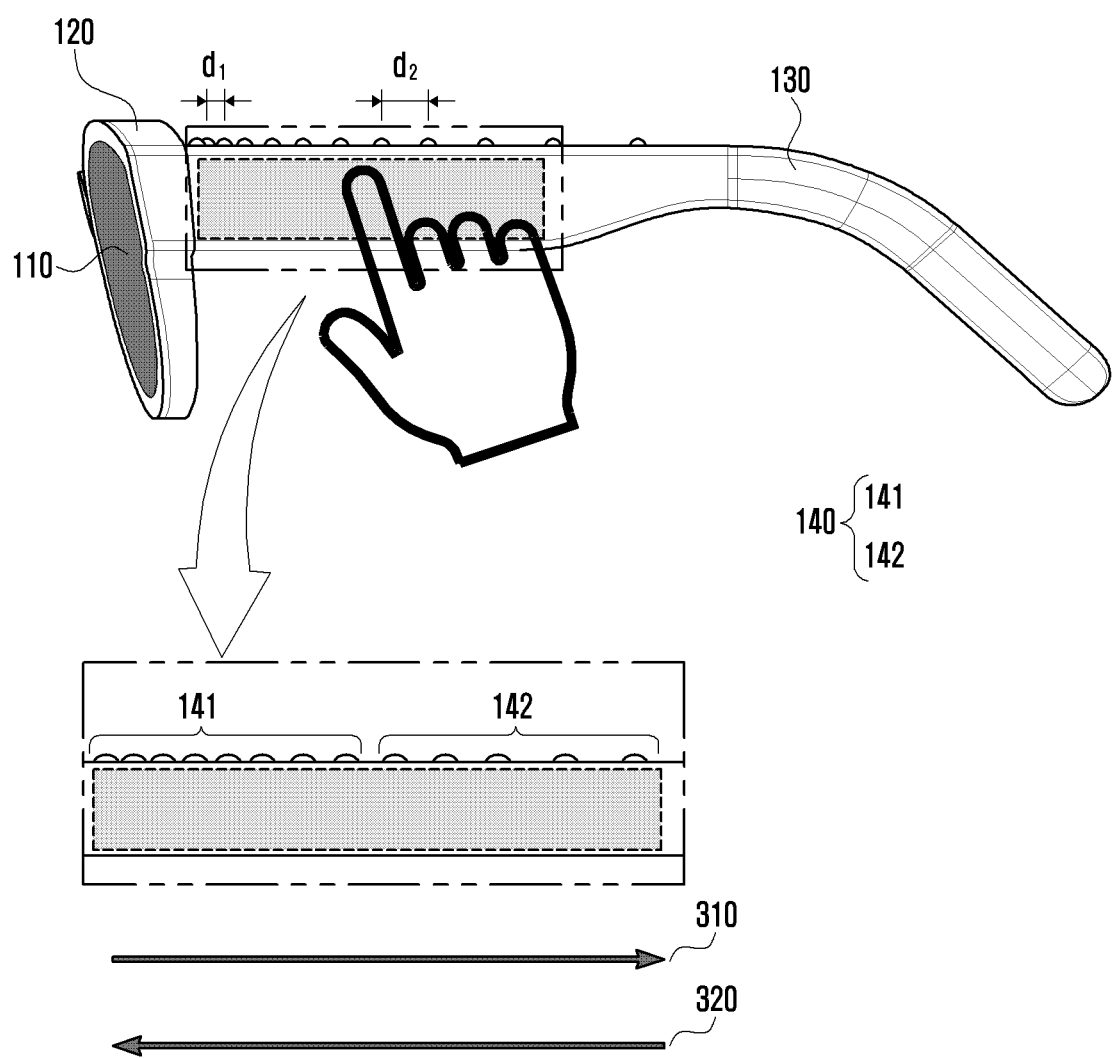
FIG. 3 illustrates a protrusion structure disposed on a wearable electronic device according to certain embodiments.

FIG. 3 illustrates a protrusion structure disposed on a wearable electronic device according to certain embodiments.

Referring to FIG. 3, according to an embodiment, the protrusion structure 140 may be disposed on at least a portion of a frame of the wearable electronic device (e.g., the wearable electronic device 101 of FIG. 1).

According to an embodiment, the protrusion structure 140 may be disposed on the support frame 130 (e.g., any one of the first support frame 131 and the second support frame of FIG. 1, on which the IMU sensor 150 is mounted). Alternatively, the protrusion structure 140 may be disposed on both the first support frame 131 and the second support frame 132. According to an embodiment, the protrusion structure 140 may also be disposed on at least one side surface of the main frame.

For example, the protrusion structure 140 may be disposed on one surface (e.g., the top) of the support frame and may be disposed on the illustrated first surface (e.g., surface A of FIG. 1), but may be disposed on another surface (e.g., surface B of FIG. 1) which is exposed to an exterior, when the wearable electronic device is worn by a user.

The protrusion structure 140 may include first protrusion patterns 141 arranged at a first interval d1, and second protrusion patterns 142 at a second interval d2 wider than the first interval d1. The protrusion patterns 141 and 142 may be arranged in a line along one surface of the support frame 130.

When the user makes contact (e.g., by dragging or rubbing) along the protrusion structure, the IMU sensor 150 may detect a degree of motion according to the contact of the protrusion structure and track the same. The IMU sensor 150 may generate sensing information (e.g., a sensor waveform), based on the detected value.

When the user contacts the support frame, the wearable electronic device may distinguish, based on the sensing information of the IMU sensor 150, between the first input moving in a first direction 310 from the position of the first protrusion patterns 141 to the position of the second protrusion patterns 142, and a second input in which the first input moves in a second direction 320 from the positions of the second protrusion patterns 142 to the positions of the first protrusion patterns 141.

Figure 4:
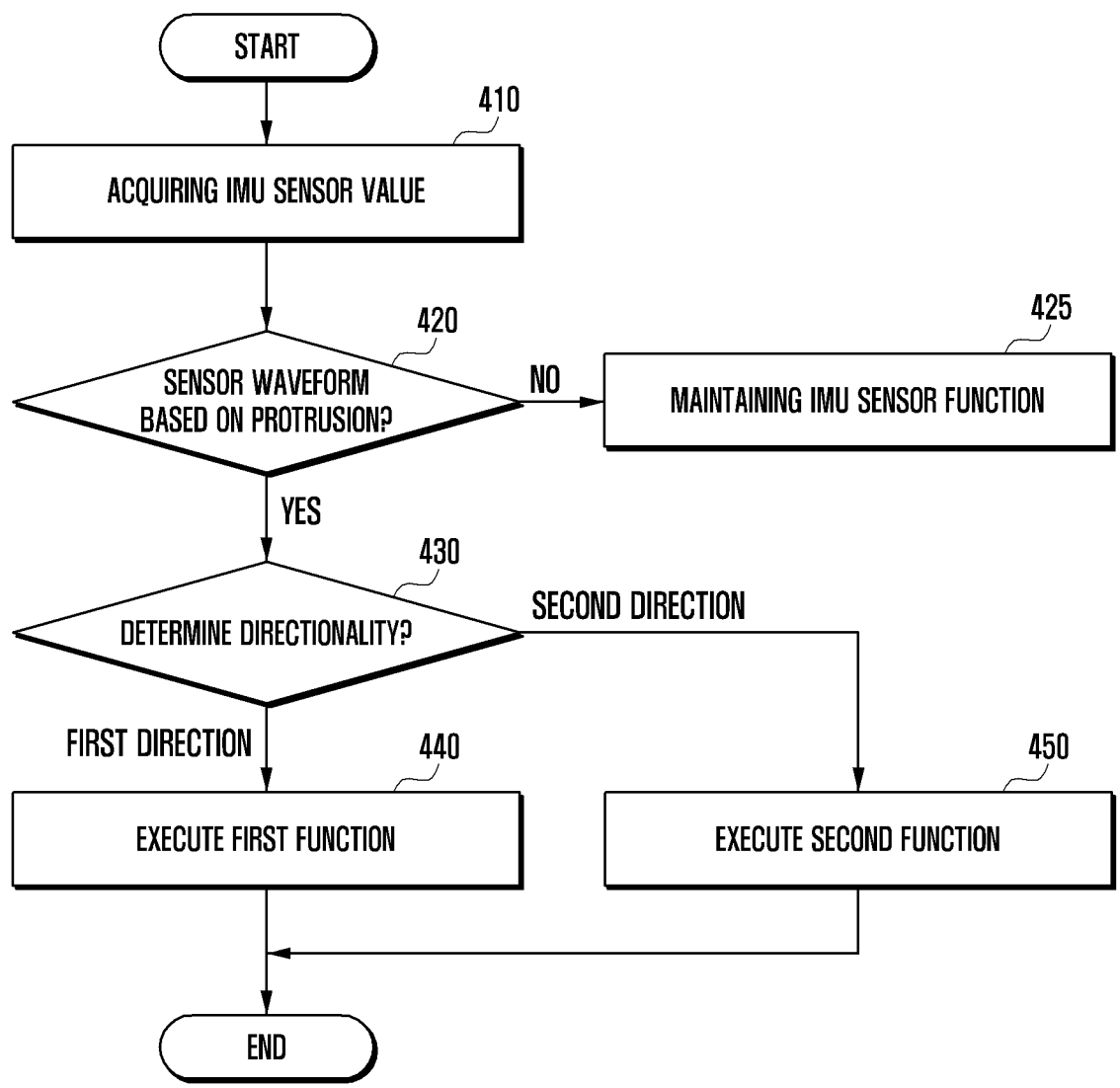
FIG. 4 shows a method for operating a wearable electronic device according to certain embodiments.
Figure 5A:
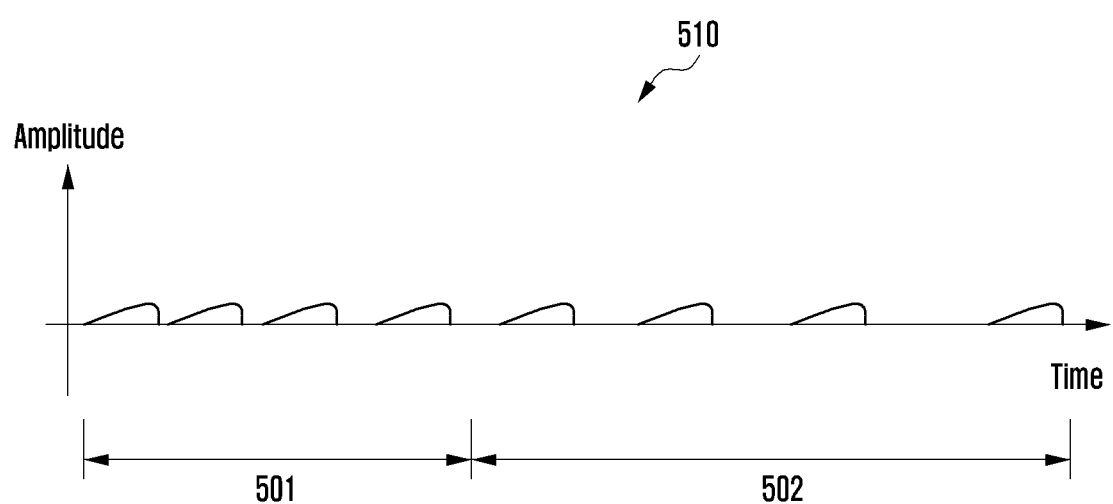
FIGS. 5A and 5B show sensor waveforms based on a protrusion structure according to certain embodiments.
Figure 5B:
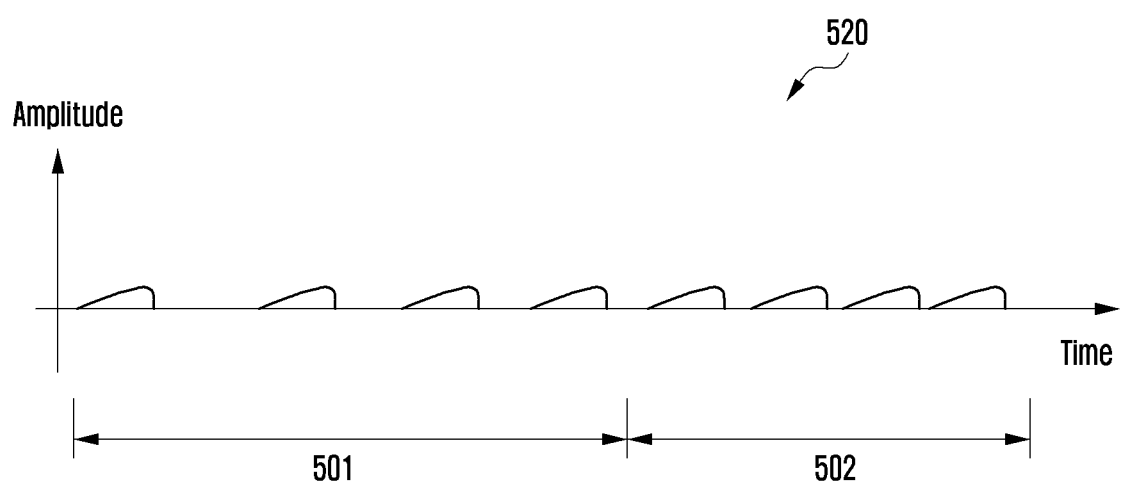

FIG. 4 shows a method for operating a wearable electronic device according to certain embodiments, and FIGS. 5A and 5B show sensor waveforms based on a protrusion structure according to certain embodiments.

Referring to FIG. 4, according to an embodiment, the processor (e.g., the processor 230 of FIG. 2) of the wearable electronic device 101 may acquire a sensor value from the IMU sensor (or a motion sensor) in operation 410.

In operation 420, the processor 230 may determine whether the IMU sensor value is a sensor waveform generated by contact with the protrusion structure. When the sensor value is not issued due to the protrusion structure, the processor 230 may proceed to operation 425 to maintain a present IMU sensor function. For example, the processor 230 may determine through the IMU sensor function whether the wearable electronic device is worn. Alternatively, the processor 230 may determine the motion of the wearable electronic device through the IMU sensor function.

When the IMU sensor value is detected as having been generated due to contact the protrusion structure, the processor 230 may determine the directionality of the sensor waveform in operation 430.

According to an embodiment, the protrusion structure may include first protrusion patterns 141 arranged at a first interval d1 and second protrusion patterns 142 at a second interval d2 wider than the first interval d1.

When the user makes contact (e.g., dragging or rubbing) along the protrusion structure, the IMU sensor 150 may detect a degree of motion according to the contact of the protrusion structure and may generate a sensor waveform accordingly. For example, when the user contacts the support frame and generates a motion in the direction 310 from the positions of the first protrusion patterns 141 to the positions of the second protrusion patterns 142, a first sensor waveform may be formed over time as shown in FIG. 5A, and when moving in the direction 320 from the positions of the second protrusion patterns 142 to the position of the first protrusion patterns 141, a second sensor waveform may be formed as shown in FIG. 5B. As noted from 501 and 502, the waveform interval is narrow at the positions of the first protrusion patterns 141, and the waveform intervals are wide at the positions of the second protrusion patterns, respectively.

The processor 230 may analyze the waveform interval to distinguish between the first input by motion in the first direction, and the second input by motion in the second direction.

The processor 230 may perform control in operation 440 such that a first function is executed or adjusted in the case of the first input moving in the first direction, and may perform control in operation 450 such that the second function is executed or adjusted in the case of the second input moving in the second direction.

According to an embodiment, the first function and the second function may be increasing and decreasing a volume, respectively. According to another embodiment, the first function and the second function may be increasing and decreasing screen brightness, respectively.

According to an embodiment, the processor 230 may also determine the first function and the second function according to a particular menu or element presently displayed through a display or a function executed in the wearable electronic device. For example, when a sensor waveform based on the protrusion structure is sensed while a music playback application is executed, the processor 230 may map the first function and the second function to volume adjustment. When a sensor waveform based on the protrusion structure is sensed while an electronic book reader is executed, the processor 230 may map the first function and the second function to screen brightness adjustment.

Figure 6:
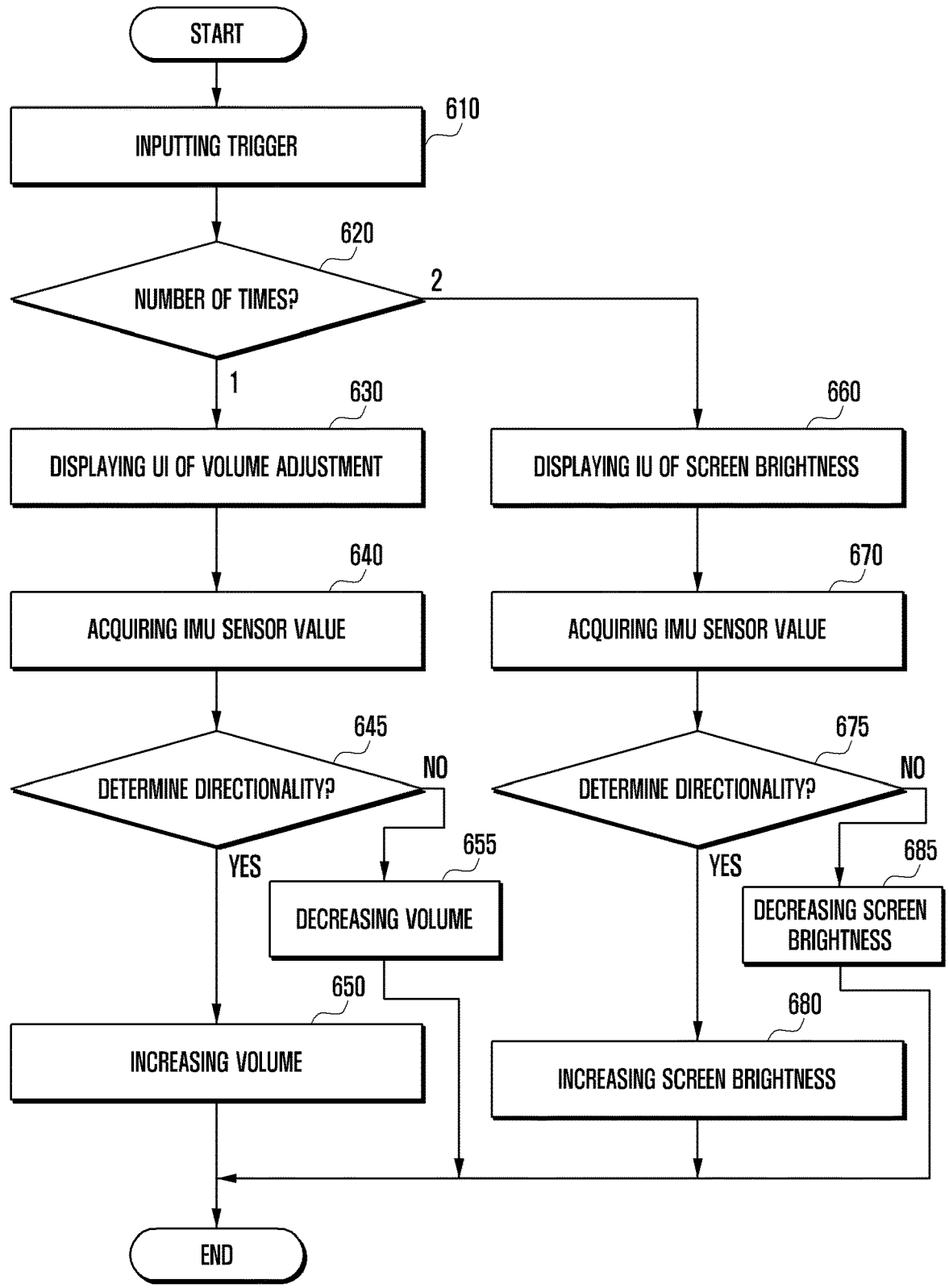
FIG. 6 shows a method for operating a wearable electronic device according to certain embodiments.

FIG. 6 shows a method for operating a wearable electronic device according to certain embodiments.

Referring to FIG. 6, the processor (e.g., the processor 230 of FIG. 2) of the wearable electronic device 101 according to an embodiment may receive a trigger input in operation 610. The trigger input may be a touch or tap input but is not limited thereto. For example, the trigger input may be a button input.

In operation 620, the processor 230 may determine the number of trigger inputs (e.g., a count thereof). In one example, when the trigger input is applied one time (e.g., a count of one), the processor 230 may proceed to operation 630 to display a first user interface which may include a volume adjustment guide through a display.

In operation 640, the processor 230 may acquire a sensor value from the IMU sensor (or a motion sensor). In operation 645, the processor 230 may determine the directionality of the sensor waveform based on the IMU sensor value. For example, when the user contacts the support frame and moves in the first direction 310 from the positions of the first protrusion patterns 141 to the positions of the second protrusion patterns 142, a first sensor waveform may be formed over time as shown in FIG. 5A, and when moving in the second direction 320 from the positions of the second protrusion patterns 142 to the position of the first protrusion patterns 141, a second sensor waveform may be formed as shown in FIG. 5B.

The processor 230 may analyze the waveform interval to distinguish between the first input moving in the first direction and the second input moving in the second direction.

In operation 650, the processor 230 may perform an adjustment such that a volume increases when the first input moving in the first direction, and in operation 655, the processor 230 may perform an adjustment such that a volume decreases when the second input moving in the second direction.

In another example, when the trigger input is applied two times (e.g., double-touch, double-tap, or double-click) (e.g., a count of 2), the processor 230 may proceed to operation 660 to display a second user interface which may include screen brightness adjustment guide through the display.

In operation 670, the processor 230 may acquire a sensor value from the IMU sensor (or motion sensor). In operation 675, the processor 230 may determine the directionality of the sensor waveform based on the IMU sensor value. The processor 230 may analyze the waveform interval to distinguish between the first input moving in the first direction and the second input moving in the second direction.

In operation 680, when the sensor waveform based on the IMU sensor value is the first input moving in the first direction, the processor 230 may perform an adjustment such that the screen brightness increases, and in operation 685, in the case of the second input moving in the second direction, the processor 230 may perform an adjustment such that the screen brightness decreases.

Figure 7:
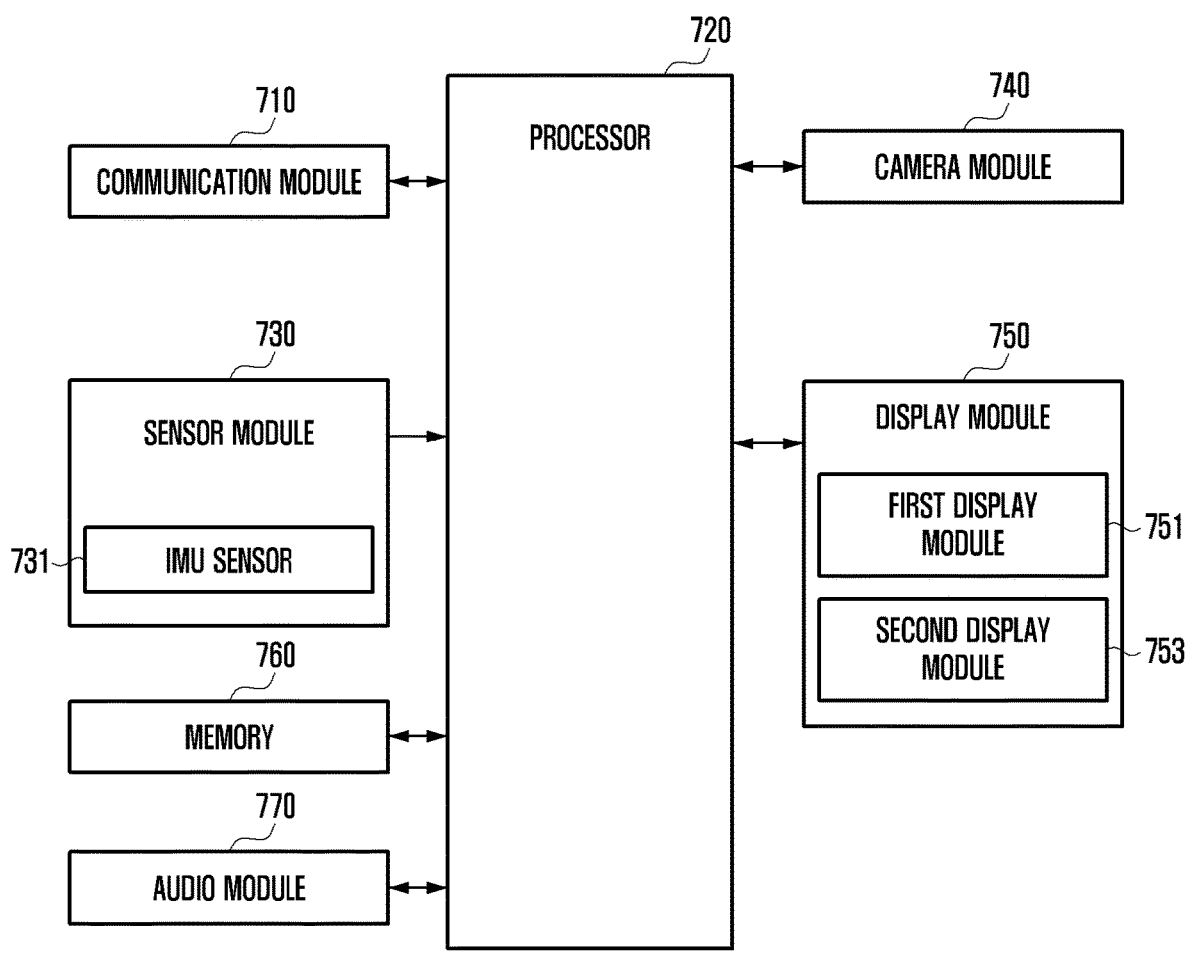
FIG. 7 illustrates a configuration of a wearable electronic device according to certain embodiments.

FIG. 7 illustrates a configuration of a wearable electronic device according to certain embodiments.

Referring to FIG. 7, an electronic device 701 (e.g., the wearable electronic device 101 of FIG. 1) according to an embodiment may include a communication module 710, a processor 720 (e.g., the processor 230 of FIG. 2), a memory 130, a sensor 730, a camera 740, a display module 750 (e.g., the display of FIG. 1), a memory 760, and an audio module 770. According to an embodiment, the electronic device 101 may be connected to an external electronic device (not shown) through a connection terminal 780 (e.g., USB TYPE-C).

Although not shown in the drawings, the electronic device may include a power management module 188, and a battery.

The communication module 710 may perform wireless communication with another electronic device (e.g., a smartphone). The communication module 710 may support establishment of a communication channel or a wireless communication channel with another electronic device and communication through the established communication channel. The communication module 710 may exchange commands and/or data with other electronic devices. For example, the wearable electronic device may be at least partially controlled by another external electronic device. For example, the electronic device 101 may perform at least one function under the control of another external electronic device.

According to an embodiment, the communication module 710 may include a wireless communication module 192 (e.g., a cellular communication module, a short-range wireless communication module, or a global navigation satellite system (GNSS) communication module) or a wired communication module (e.g., a local area network (LAN) communication module or a power line communication module). The corresponding communication module among these communication modules may communicate with another electronic device externally through a first network (e.g., a short-range communication network such as Bluetooth, wireless fidelity (Wi-Fi) direct, or infrared data association (IrDA)) or a second network (e.g., telecommunication networks such as legacy cellular networks, 5G networks, next-generation telecommunication networks, Internet, or computer networks (e.g., LAN or WAN)). These various types of communication modules may be integrated into one element (e.g., a single chip) or may be implemented as a plurality of separate elements (e.g., multiple chips).

The communication module 710 may support a 5G network after a 4G network and a next-generation communication technology, for example, a new radio (NR) access technology. The NR access technology may support an enhanced mobile broadband (eMBB), massive machine type communications (mMTC), or ultra-reliable and low-latency communications (URLLC). The communication module 710 may support, for example, a high frequency band (e.g., mmWave band) to achieve a high data transmission rate. The communication module 710 may support various technologies for securing performance in a high frequency band, for example, the technologies, such as beamforming, massive multiple-input and multiple-output (MIMO), full-dimensional MIMO (FD-MIMO), an array antenna, analog beamforming, or a large scale antenna.

The processor 720 may execute a program (e.g., the program 140 of FIG. 1) stored in the memory 760 to control at least another component (e.g., a hardware or a software component) and perform various data processing or arithmetic operation. According to an embodiment, as at least part of data processing or arithmetic operation, the processor 720 may store commands or data received from another component (e.g., the sensor 730) in a volatile memory, process the commands or data stored in the volatile memory, and store the result data in a non-volatile memory.

The sensor module 730 may sense an operating state (e.g., power or temperature) of the electronic device 101 or an external environmental state (e.g., a user state), and may generate an electrical signal or data value corresponding to the sensed state.

According to an embodiment, the sensor module 730 may include an IMU sensor 731.

According to an embodiment, the sensor module 730 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The proximity sensor may sense an object adjacent to the electronic device 101.

The camera module 740 may capture still images and moving images. According to an embodiment, the camera module 740 may include one or more lenses, image sensors, image signal processors, or flashes.

The camera module 740 may include at least one of a gesture camera, an eye tracking camera, a depth camera, and/or a red green blue (RGB) camera. The gesture camera may sense a user's motion. At least one gesture camera may be disposed in the electronic device 101 and may sense a user's hand motion within a predetermined distance. The gesture camera may include a simultaneous localization and mapping camera (SLAM) for recognizing information (e.g., a location and/or a direction) related to the surrounding space of the electronic device 101. The eye tracking camera may track motions of the user's left eye and right eye. The depth camera may measure a distance to an object located in front of the electronic device 101. The depth camera may include a time of flight (TOF) camera and/or a depth camera. A red green blue (RGB) camera may sense color-related information of an object and information on a distance to the object. According to an embodiment, the electronic device 101 may include one type of camera by integrating the depth camera and the RGB camera.

The display module 750 may include at least one glass (e.g., the first glass 110a and/or the second glass 110b of FIG. 1). According to an embodiment, the first glass 110a may include at least a portion of the first display module 751, and the second glass 110b may include at least a portion of the second display module 753. For example, the first display module 751 and the second display module 753 may each include a display panel. The display panel may be formed of a transparent element so that a user can recognize a real space through the display module 750. The display module 750 may display at least one virtual object on at least a portion of the display panel such that the virtual object is viewed to be superimposed on a real space by a user wearing the electronic device 101. For example, a user's field of view may include an angle or range at which the user can recognize an object.

The memory 760 may store various data used by at least one element (e.g., the processor 720 or the sensor module 730) of the electronic device 101. The data may include, for example, software and input data or output data for instructions related thereto. The memory 760 may include a volatile memory or a non-volatile memory.

The audio module 770 may convert a sound into an electric signal or, conversely, convert an electric signal into a sound, based on the control of the processor 720. For example, the audio module 770 may include a speaker and/or a microphone.

Figure 8:
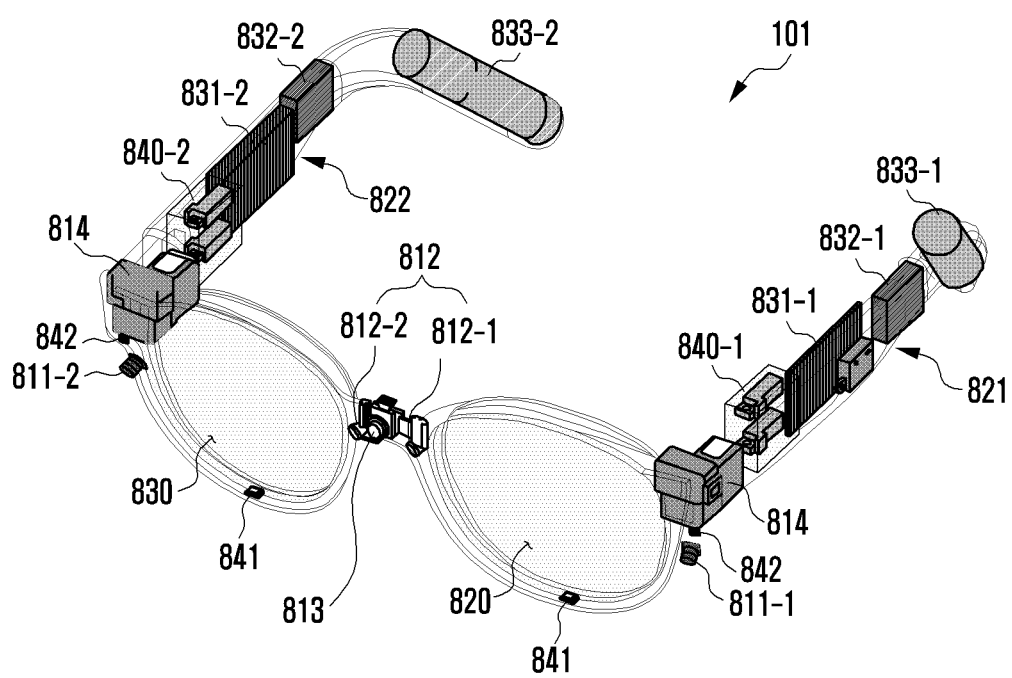
FIG. 8 illustrates an internal configuration of a wearable electronic device that provides an augmented reality service, according to certain embodiments.

FIG. 8 illustrates an internal configuration of a wearable electronic device that provides an augmented reality service, according to certain embodiments.

Referring to FIG. 8, the wearable device 101 according to certain embodiments may be worn on a user's face to provide an image related to an augmented reality (AR), mixed reality (MR), or virtual reality (VR) service.

A main frame 823 and the support frames (e.g., the first support frame 821 and/or the second support frame 822) may mount elements of the wearable device 101. The main frame 823 and the support frames 821 and 822 may be operatively connected through the hinges 840-1 and 840-2. The main frame 823 may be at least partially supported on the user's nose, and the first support frame 821 and the second support frame 822 may be supported on the user's ears.

The main frame 823 may include transparent members (e.g., the first transparent member 820 and/or the second transparent member 830) corresponding to the user's both eyes (e.g., left and/or right eyes), a display (e.g., the first display 814-1 and the second display 814-2), an optical waveguide, a camera (e.g., the recognition cameras 811-1 and 811-2), eye tracking cameras 812-1 and 812-2, a capturing camera 813, and a lighting member (e.g., 842-1, 842-2, and 842-3).

The transparent members (e.g., the first transparent member 820 and/or the second transparent member 830) may include a display (or a light source). For example, the first transparent member 820 corresponding to the user's left eye may be connected to the first display 814-1, and the second transparent member 830 corresponding to the user's right eye may be connected to the second display 814-2. The first transparent member 820 and the second transparent member 830 may be formed of a glass plate, a plastic plate, or a polymer, and may be made to be transparent or translucent.

The displays (e.g., the first display 814-1 and the second display 814-2) may include a liquid crystal display (LCD) device, a digital mirror device (DMD), and a liquid crystal on silicon (LCoS) display device, an organic light emitting diode (OLED), or a micro light emitting diode (micro LED).

Although not shown, when the display (e.g., 814-1 and 814-2) is made of one of a liquid crystal display device, a digital mirror device, or a liquid crystal on silicon display device, the wearable device 101 may include a light source that emits light to a screen output region of the display (e.g., 814-1 and 814-2).

In another embodiment, when the display (e.g., 814-1 and 814-2) generates light by itself, such as, for example, when it is formed of one of an organic light emitting diode or a micro LED, the wearable device 101 may provide a virtual image to a user without including a separate light source. In an embodiment, a light source is unnecessary when the display (e.g., 814-1 and 814-2) is implemented using organic light emitting diodes or a micro LED, so that the weight of the wearable device 101 may be reduced.

In certain embodiments, the displays (e.g., 814-1 and 814-2), when transparent, may be disposed at a position facing the user's eye to form a screen display unit (or screen output region).

According to an embodiment, the first transparent member 820 and the second transparent member 830 may include a light collecting lens and/or an optical waveguide. For example, the optical waveguide may be located at least partially on a part of the transparent member. The optical waveguide may serve to transmit a light of the light source generated by the display (e.g., 814-1 and 814-2) to the user's eyes. For example, light incident to one end of the optical waveguide may be propagated inside the display optical waveguide by a nano-pattern to be provided to the user.

The optical waveguide may be formed of glass, plastic, or a polymer, and may include a nano-pattern formed on one surface of the inner portion or outer portion thereof, for example, a polygonal or curved grating structure. According to an embodiment, the optical waveguide may include at least one of at least one diffractive element (e.g., a diffractive optical element (DOE), a holographic optical element (HOE)), or a reflective element (e.g., a reflective mirror). According to an embodiment, the optical waveguide may guide the display light emitted from the light source to the user's eyes by using at least one diffractive element or reflective element.

According to certain embodiments, the diffractive element may include an input optical member/output optical member (not shown). The input optical member may refer to an input grating area, and the output optical member (not shown) may refer to an output grating area. The input grating area may serve as an input terminal for diffracting (or reflecting) light output from (e.g., a Micro LED) to transmit the light to the transparent member (e.g., the first transparent member 820 and the second transparent member 830) of the screen display unit. The output grating area may serve as an exit for diffracting (or reflecting) light transmitted to the transparent member (e.g., the first transparent member 820 and the second transparent member 830) of the optical waveguide to the user's eyes.

The reflective element may include a total reflection optical element or a total reflection waveguide for total internal reflection (TIR). The total reflection may refer to a way of guiding light in which an angle of incidence is formed such that light (e.g., a virtual image) input through the input grating area is 100% reflected from one surface (e.g., a specific surface) of the optical waveguide, thereby 100% transmitting up to the output grating area.

The light emitted from the display (e.g., 814-1 and 814-2) may be guided to an optical path by an optical waveguide through the input optical member. The light moving inside the optical waveguide may be guided toward the user's eyes through the output optical member.

According to an embodiment, the screen display unit (or the screen output region) may be determined based on light emitted toward the eyes.

According to an embodiment, the camera may include a first camera, a second camera, and a third camera. For example, the first camera may be the recognition cameras 811-1 and 811-2 for hand detection/tracking and spatial recognition, the second camera may be eye tracking cameras 812-1 and 812-2 for identifying the user's gaze direction, and the third camera is a capturing camera 813 for capturing an image corresponding to a user's field of view (FoV) and/or for measuring a distance to an object.

The recognition cameras 811-1 and 811-2 may be used for 3-degrees-of-freedom (3DoF) and 6-degrees-of-freedom (6DoF) head tracking, hand detection, and hand tracking. The recognition cameras 811-1 and 811-2 may be utilized to perform spatial recognition for 6DoF and a simultaneous localization and mapping (SLAM) function through depth capture. In addition, the recognition cameras 811-1 and 811-2 may be utilized for a user gesture recognition function. For example, the recognition cameras 811-1 and 811-2 may include a global shutter (GS) camera with less screen drag, like a rolling shutter (RS) camera, in order to detect and track quick hand gestures and minute motions by a finger or the like.

The eye tracking cameras 812-1 and 812-2 may detect a user's gaze direction (e.g., an eye motion). The eye tracking cameras 812-1 and 812-2 may detect the user's pupils to track a gaze direction and may be utilized to enable the center of a virtual image to move to correspond to the gaze direction. For example, the eye tracking camera 212 may be utilized as a global shutter (GS) camera to sense a pupil and track a quick eye motion without screen drag, and the performance and specifications of each eye tracking camera may be substantially the same.

The capturing camera 813 may include a high-resolution camera such as a high resolution (HR) camera and a photo video (PV) camera. For example, the capturing camera 813 may be utilized to acquire a high-quality image, such as an auto focus function and an optical image stabilizer (OIS). The capturing camera 813 may be implemented as a temporary GS camera and a rolling shutter (RS) camera, in addition to a color camera.

The lighting members 842-1 and 842-2 may be used for different purposes, respectively, depending on a location where the same are attached to the wearable device 101. The lighting member attached to the periphery of the eye tracking camera may be used as an auxiliary input for sensing eye gaze when a pupil is captured by the eye tracking camera. In this case, as the lighting member, an IR LED having an infrared wavelength may be used rather than that having a visible light wavelength.

According to an embodiment, although not shown, the lighting member attached to the periphery of the GS camera may be utilized as a means of supplementing ambient brightness in capturing by the GS camera. For example, the lighting member may be used when a subject to be captured is not easily sensed due to the dark environment or mixing and reflection by light from various light sources.

The number and positions of cameras included in the wearable device 101 are not limited by the explicit examples provided herein, and the number and positions of cameras may vary based on the type (e.g., the shape or the size) of the wearable device 101.

According to an embodiment, the main frame may include a plurality of microphones 841-1, 842-2, and 842-3 for receiving a user's voice and ambient sounds.

A first support 821 and/or a second support 822 may include printed circuit boards 831-1 and 831-2, speakers 832-1 and 832-2 for outputting an audio signal, batteries 833-1 and 833-2, and/or hinges 840-1 and 840-2.

The printed circuit boards 831-1 and 831-2 may include a flexible board. The printed circuit boards 831-1 and 831-2 may transmit an electrical signal to respective elements (e.g., a camera, a display, a microphone, and a speaker).

The speakers 232-1 and 232-2 may include a first speaker 232-1 for transmitting an audio signal to the user's left ear, and a second speaker 232-2 for transmitting an audio signal to the user's right ear. The batteries 233-1 and 233-2 may supply power to the printed circuit boards 831-1 and 831-2 through a power management module (not shown).

According to an embodiment, the wearable device 101 illustrated in FIG. 8 may include the inertial motion unit (IMU) sensor and the protrusion structure illustrated in FIG. 8. As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The invention claimed is:

1. A wearable electronic device, comprising:
a display;
a main frame configured to secure the display;
a first support frame and a second support frame connected to opposite ends of the main frame, respectively, and mountable on ears;
a motion sensor installed to at least one of the first support frame and the second support frame and configured to detect a movement of the wearable electronic device; a processor operatively connected to the display and the motion sensor; and
a protrusion structure formed on one surface of at least one of the first support frame and the second support frame, the protrusion structure including first protrusion patterns disposed at a first interval, and second protrusion patterns disposed at a second interval wider than the first interval,
wherein the motion sensor is further configured to detect a waveform generated by user's contact with the first protrusion patterns and the second protrusion patterns, and
the processor is configured to receive a user input based on the detected waveform from the motion sensor.

2. The wearable electronic device of claim 1,
wherein the processor is configured to receive sensing information from the motion sensor and determine a directionality of the user input.

3. The wearable electronic device of claim 1, wherein the protrusion structure is integrally formed with or coupled to at least one of the first support frame and the second support frame using an identical member to the first support frame and the second support frame.

4. The wearable electronic device of claim 2, wherein the processor is configured to:
determine whether sensing information received from the motion sensor is the waveform generated via contact with the protrusion structure,
determine the directionality of the user input when the waveform is generated via contact with the protrusion structure, and
detect the movement of the wearable electronic device when the waveform is generated in absence of contact with the protrusion structure.

5. The wearable electronic device of claim 4, wherein the processor is further configured to:
execute a first function when the directionality of the waveform indicates a first direction, and execute a second function when the directionality of the waveform indicates a second direction.

6. The wearable electronic device of claim 4, wherein the waveform moves in a first direction when the waveform detected by the motion sensor starts from a subset of protrusions within the first interval and terminates at a subset of protrusions within the second interval, and wherein the waveform moves in a second direction when the waveform detected by the motion sensor starts from the subset of protrusions within the second interval and terminates at the subset of protrusions within the first interval.

7. The wearable electronic device of claim 5, wherein the first function increases a volume, and wherein the second function decreases the volume.

8. The wearable electronic device of claim 5, wherein the first function increases a screen brightness, and wherein the second function decreases the screen brightness.

9. The wearable electronic device of claim 5, further comprising a speaker, wherein the processor is further configured to:

output voice information via the speaker indicating a result of executing the first function or the second function.

10. The wearable electronic device of claim 5, wherein the processor is further configured to:

map different processes to the first function or the second function, according to a type of user interface displayed on the display.

11. The wearable electronic device of claim 1, further comprising an input detection circuit partially disposed on at least a portion of the main frame, the first support frame, and the second support frame, wherein the processor is further configured to:

detect a trigger input based on a signal received from the input detection circuit;

detect a count of individual inputs included in the detected trigger input;

when the count is one, output a first user interface including a volume adjustment guide via the display, when the user input based on a first waveform detected from the motion sensor is in a first direction, increase a volume, and when the user input based on a second waveform detected from the motion sensor is in a second direction opposite to the first direction, decrease a volume.

12. The wearable electronic device of claim 11, wherein the processor is further configured to:

when the count is two, display a second user interface including a screen brightness adjustment guide via the display, wherein when the user input is in the first direction, increase a screen brightness, and wherein when the user input is in the second direction, decrease a screen brightness.

13. The wearable electronic device of claim 11, wherein the input detection circuit comprises a touch circuit, and wherein the trigger input includes a touch input or a tap input.

14. A glasses-type wearable electronic device, comprising:

a display;

a frame configured to support the display;

a motion sensor mounted on at least a portion of the frame and configured to detect a movement of the wearable electronic device;

a processor operatively connected to the display and the motion sensor; and a protrusion structure formed on at least a partial surface of the frame, wherein the protrusion structure includes first protrusion patterns disposed at a first interval, and second protrusion patterns disposed at a second interval wider than the first interval, wherein the motion sensor is further configured to detect a waveform generated by user's contact with the first protrusion patterns and the second protrusion patterns, and the processor is configured to receive a user input based on the detected waveform from the motion sensor.

15. The glasses-type wearable electronic device of claim 14, wherein the frame includes:

a main frame configured to support the display, and a first support frame and a second support frame connected to the opposite ends of the main frame, respectively, and mountable on ears.

16. The glasses-type wearable electronic device of claim 14, wherein the processor is configured to receive sensing information from the motion sensor to determine directionality of the user input.

17. The glasses-type wearable electronic device of claim 16, wherein the processor is further configured to:

execute a first function when the directionality of the waveform detected by the motion sensor indicates a first direction, and execute a second function when the directionality of the waveform indicates a second direction.

18. The glasses-type wearable electronic device of claim 17, wherein the waveform moves in a first direction when the waveform detected by the motion sensor starts from a subset of protrusions within the first interval and terminates at a subset of protrusions within the second interval, and wherein the waveform moves in a second direction when the waveform detected by the motion sensor starts from the subset of protrusions within the second interval and terminates at the subset of protrusions within the first interval.

19. The glasses-type wearable electronic device of claim 18, wherein the first function increases a volume, and wherein the second function decreases the volume.

20. The glasses-type wearable electronic device of claim 18, wherein the first function increases a screen brightness, and wherein the second function decreases the screen brightness.

* * * * *